(No Model.)
A. HEITHECKER.
FLUID PRESSURE REGULATOR.
No. 595,540. Patented Dec. 14, 1897.
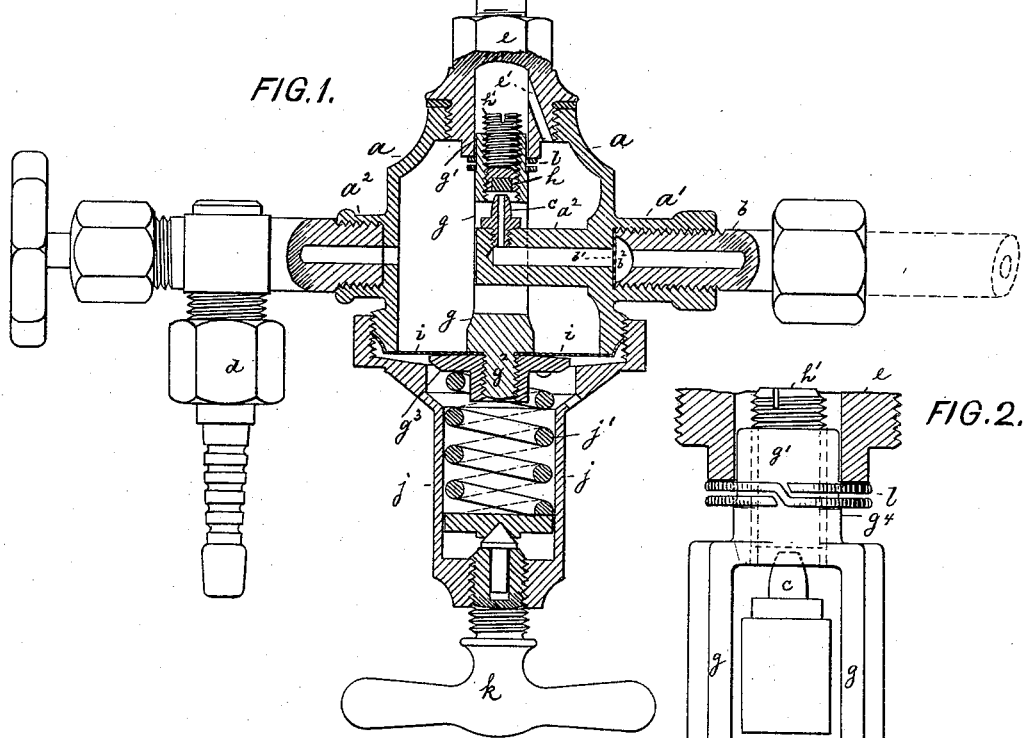
Witnesses:
John Becker.
William Schulz.
Inventor:
August Heithecker
per Roeder & Briesen, attorneys

UNITED STATES PATENT OFFICE.

AUGUST HEITHECKER, OF BROOKLYN, NEW YORK.

FLUID-PRESSURE REGULATOR.

SPECIFICATION forming part of Letters Patent No. 595,540, dated December 14, 1897.

Application filed August 24, 1897. Serial No. 649,292. (No model.)

*To all whom it may concern:*

Be it known that I, AUGUST HEITHECKER, of Brooklyn, county of Kings, and State of New York, have invented an Improved Pressure-Regulating Valve, of which the following is a specification.

This invention relates to improvements on the class of valves for reducing and regulating the pressure of gas described in Patent No. 496,735, granted to me May 2, 1893.

The object of the present invention is to effect a more rapid closing of the valve when the fountain has received its full charge and to provide improved means for guiding the valve-carrying yoke.

In the accompanying drawings, Figure 1 is a longitudinal section of a valve embodying my invention; Fig. 2, a detail side view of the yoke, and Fig. 3 a plan of the same.

The letter $a$ represents the valve-casing, having the gas inlet $a'$ and outlet $a^2$. Into the inlet $a'$ screws the nipple $b$, provided with a strainer $b'$ directly back of an accumulating-cavity $b^2$ and adapted to be coupled to a gas-supply cylinder. The inlet $a'$ communicates with an inwardly-extending tubular boss, carrying the nozzle $c$, which discharges the gas into the interior of the casing $a$, from whence it flows through outlet $a^2$ and nozzle $d$ into the fountain to be charged.

Into the upper end of the casing $a$ is screwed a centrally-perforated plug $e$, communicating at its upper end with a gas-pressure gage $f$, that is supplied with gas by a diagonal port $e'$. Within the bore of the plug $e$ is guided the upper tubular stem $g'$ of a reciprocating yoke $g$, which incloses the valve $h$ of nozzle $c$. The lower threaded end $g^2$ of yoke $g$ passes through a diaphragm $i$, to which it is intimately connected by nut $g^3$, so that yoke and diaphragm move in unison. The diaphragm $i$ is secured to the lower edge of casing $a$ and above a screw-cap $j$, containing a strong spring $j'$, that bears against the nut $g^3$ and tends to throw the diaphragm upward and consequently to raise the yoke and open the valve. The tension of spring $j'$ may be adjusted by a hand-screw $k$ to set the valve to any desired pressure, as will be readily understood.

The tubular stem $g'$ of the yoke $g$, working within the bore of plug $e$, constitutes a positive guide for the yoke and takes all undesirable strain off the stem of valve $h$. This valve is seated within a bottom cavity of a screw $h'$, engaging an internal thread of stem $g'$, and can be adjusted vertically by turning said screw. In my former patent, hereinabove referred to, the yoke $g$ did not have the tubular stem $g'$ and the shank of screw $h'$ itself constituted the guide for the yoke. This was objectionable, because the constant wear and strain on the screw-shank would tend to loosen the valve.

The stem $g'$ is embraced by a weak spring $l$, seated upon an offset $g^4$ of the stem and engaged on top by the lower end of plug $e$. This spring has a constant tendency to lower the yoke and to close the valve, and it thus assists the gas-pressure, which when strong enough to bulge the diaphragm $i$ has a similar tendency.

The function of the spring $l$ begins more particularly at the moment the fountain has received its full charge. During the first stages of the charging operation the pressure is somewhat beneath the point desired, because of the empty space in the fountain. When, however, the fountain is full, the pressure rises and the gas, acting against the diaphragm, will draw down the yoke to close the valve. This action, however, when unassisted will be gradual or slow, and consequently time will be unnecessarily consumed. By the use of the additional spring $l$ the gas will be greatly assisted to draw down the yoke and close the valve promptly as soon as the fountain is full and the pressure has consequently risen. Thus the charging operation is quickly performed and no time is lost at the last stage of the operation.

What I claim is—

In a pressure-regulator, the combination of a valve-casing with a nozzle, a diaphragm, a yoke connected thereto and having a tubular stem, an interior screw engaging such stem, a valve secured to the screw, a tubular guide surrounding the yoke-stem, and a spring seated upon such stem, substantially as specified.

A. HEITHECKER.

Witnesses:
F. V. BRIESEN,
WILLIAM MILLER.